United States Patent [19]

Scheer

[11] 3,800,163

[45] Mar. 26, 1974

[54] ELECTRONIC PROGRAMMER FOR AUTOMATED EQUIPMENT

[75] Inventor: Erich Scheer, Peterzell/Schwarzwald, Germany

[73] Assignee: Kundo Kieninger & Obergbell, Schwarzwald, Germany

[22] Filed: Oct. 24, 1972

[21] Appl. No.: 300,326

[30] Foreign Application Priority Data

Oct. 23, 1971 Germany ........................... 2152903

[52] U.S. Cl. ................................ 307/115, 318/443

[51] Int. Cl. ........................................... G05b 19/06

[58] Field of Search ..... 307/115, 141, 141.4, 141.8; 318/443, 162

[56] References Cited

UNITED STATES PATENTS

| | | | |
|---|---|---|---|
| 2,979,579 | 4/1961 | Holzer | 307/141 X |
| 2,994,813 | 8/1961 | Towner et al. | 318/443 X |

FOREIGN PATENTS OR APPLICATIONS

| | | | |
|---|---|---|---|
| 803,623 | 10/1958 | Great Britain | 307/115 |

*Primary Examiner*—James R. Scott
*Assistant Examiner*—M. Ginsburg
*Attorney, Agent, or Firm*—Karl F. Ross; Herbert Dubno

[57] ABSTRACT

A multistage binary frequency divider steps down the frequency of an alternating-current source, such as a commercial or municipal power-supply network, to provide a plurality of output leads carrying square waves of harmonically related pulse cadences. These output leads are connected in parallel, through a diode matrix, to the input circuit of a transistor which controls the energization of a drive motor for a contact-carrying platter. With the period of the longest square wave exceeding the maximum standstill interval of the drive motor during a program cycle, the duration of each standstill interval can be selected in, say, 10-second increments between a fraction of a minute and several minutes. This is done by selectively short-circuiting different combinations of output leads in the various operating positions of the platter, the unshorted output leads maintaining the transistor conductive for a time equaling the combined width of their respective square-wave pulses. Thereafter, the transistor is cut off and fires a thyristor in series with the drive motor. Other platter-controlled contacts in series with respective manually controlled switches can short out the entire frequency divider in certain phases of the program cycle to allow skipping a part of the program. The frequency divider is also shorted during rotation of the platter by a contact whose closure resets all its binary stages to zero.

10 Claims, 4 Drawing Figures

ELECTRONIC PROGRAMMER FOR AUTOMATED EQUIPMENT

Field of the Invention

The present invention relates to an electronic programmer designed to control the operation of automated equipment, e.g., household appliances such as washing machines and dishwashers, with the aid of a movable program carrier such as a rotating platter which is intermittently driven, with standstill intervals of varying duration, to initiate successive phases of a program cycle.

Background of the Invention

In such systems it was originally the practice to let the program carrier advance (continuously or in steps) at the same means rate throughout the cycle, regardless of the number of switching operations to be performed at different stages of the program. In order to eliminate the resulting underutilization of available platter surface, it has already been proposed to slow down or arrest the platter drive under the control of a timer which reaccelerates or restarts the platter after a longer or shorter interval. For this purpose it is known, e.g., from British Pat. No. 803,623, to use a continuously moving ancillary contact carrier which cuts the platter drive in and out at predetermined instants in the cycle.

OBJECTS OF THE INVENTION

The general object of my present invention is to provide a compact and reliable system of this character which eliminates the need for a timing of the carrier motion by wear-prone mechanical contacts and limits the use of such contacts to the opening and closure of low-power circuitry in the input of an electronic controller, thereby minimizing arcing and deterioration of contact springs or brushes.

A more specific object of my invention is to provide means in such a system facilitating changes in the duration of the standstill intervals of the program carrier.

Another object is to provide highly accurate electronic timing means adapted to establish, in such a system, a wide variety of standstill intervals with a minimum duration on the order of seconds and a maximum duration on the order of minutes, selectable in small incremental steps of, say, 10 seconds.

SUMMARY OF THE INVENTION

These objects are attained, in accordance with my present invention, by the provision of a multistage binary frequency divider which is connectable across a source of alternating current of a predetermined basic frequency, such as an outlet of a commercial or municipal power-supple network operating at 50 or 60 Hz, and which generates at respective stage outputs a plurality of square waves with pulse cadences that are harmonically related to one another and to the basic frequency. In each operating position of the program carrier, one or more contacts controlled by this carrier connect a selected stage output or a combination of such outputs of the frequency divider to an electronic controller in the actuating circuit of the program drive in order to inhibit the actuation of that drive, and therefore the advance of the program carrier, during a standstill interval determined by the pulse width of the square wave present on the selected stage output or of the combined pulse width of several such square waves in case a combination of output are selected.

If it is desired to accelerate the cycle by skipping one or more switching operations normally included in the program, another feature of my invention calls for the provision of one or more manually operable overriding switches and coacting circuit closers controlled by the program carrier for maintaining the frequency divider inactive during one or more phases of its cycle whereby the drive of the program carrier remains actuated in the corresponding operating position or positions regardless of the setting of the carrier-controlled selection contacts.

With some appliances it is desirable to extend certain of the standstill intervals beyond their programmed duration, e.g., for the purpose of allowing water or some other treatment liquid to attain a certain temperature or to reach a predetermined level in a tank. In such instances the system may include, pursuant to still another feature of my invention, one or more monitoring units each responsive to a particular condition of the appliance and designed to transmit to the controller, in a corresponding operating position of the program carrier, a supplemental signal preventing the actuation of the carrier drive independently of the setting of the selection contacts.

Brief Description of the Drawing

The above and other features of my invention will be described in detail hereinafter with reference to the accompanying drawing in which.

Specific Description

Figure 1A:
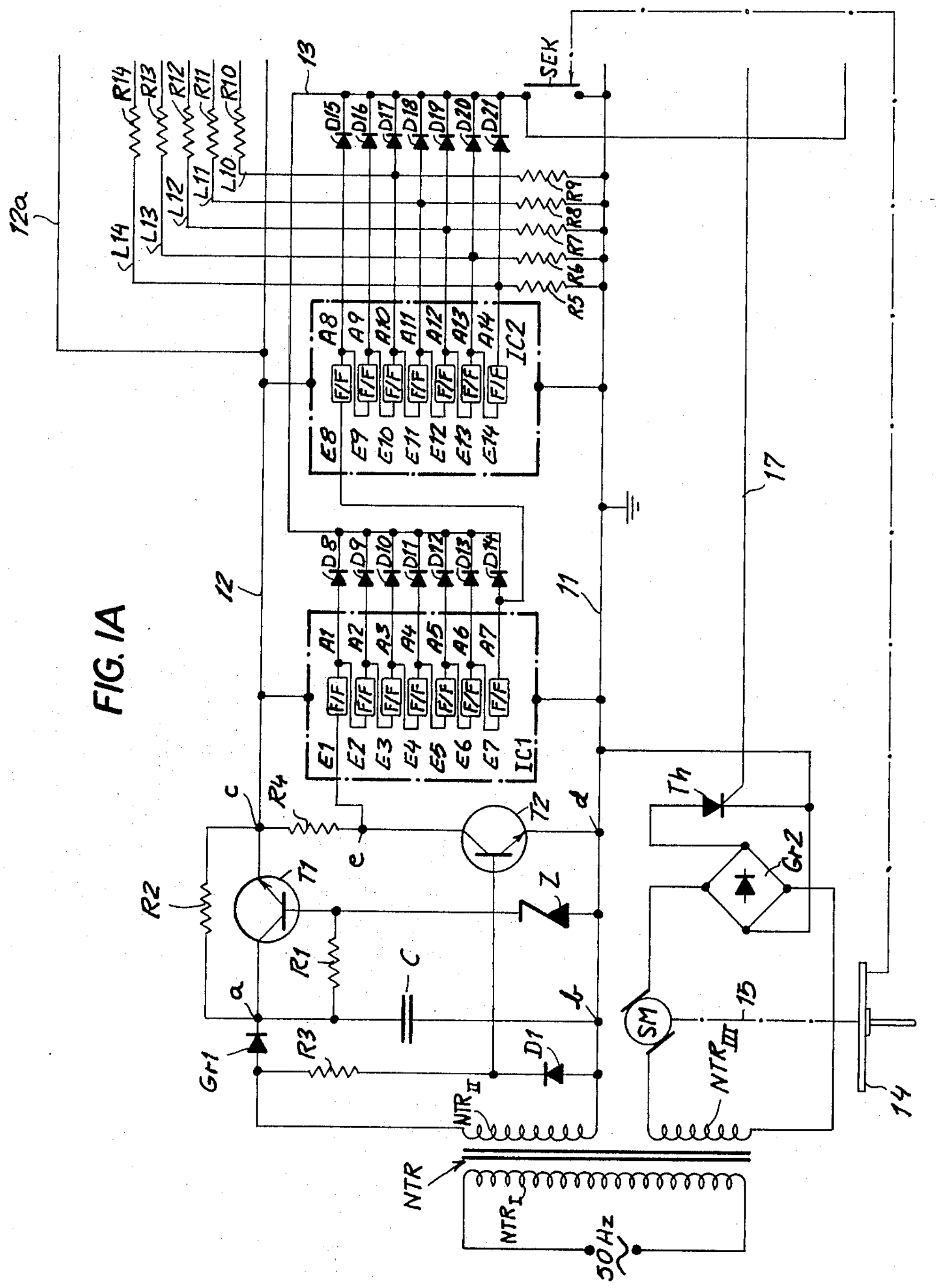
FIG. 1A is a circuit diagram of part of an electronic programmer embodying the invention.
Figure 1B:
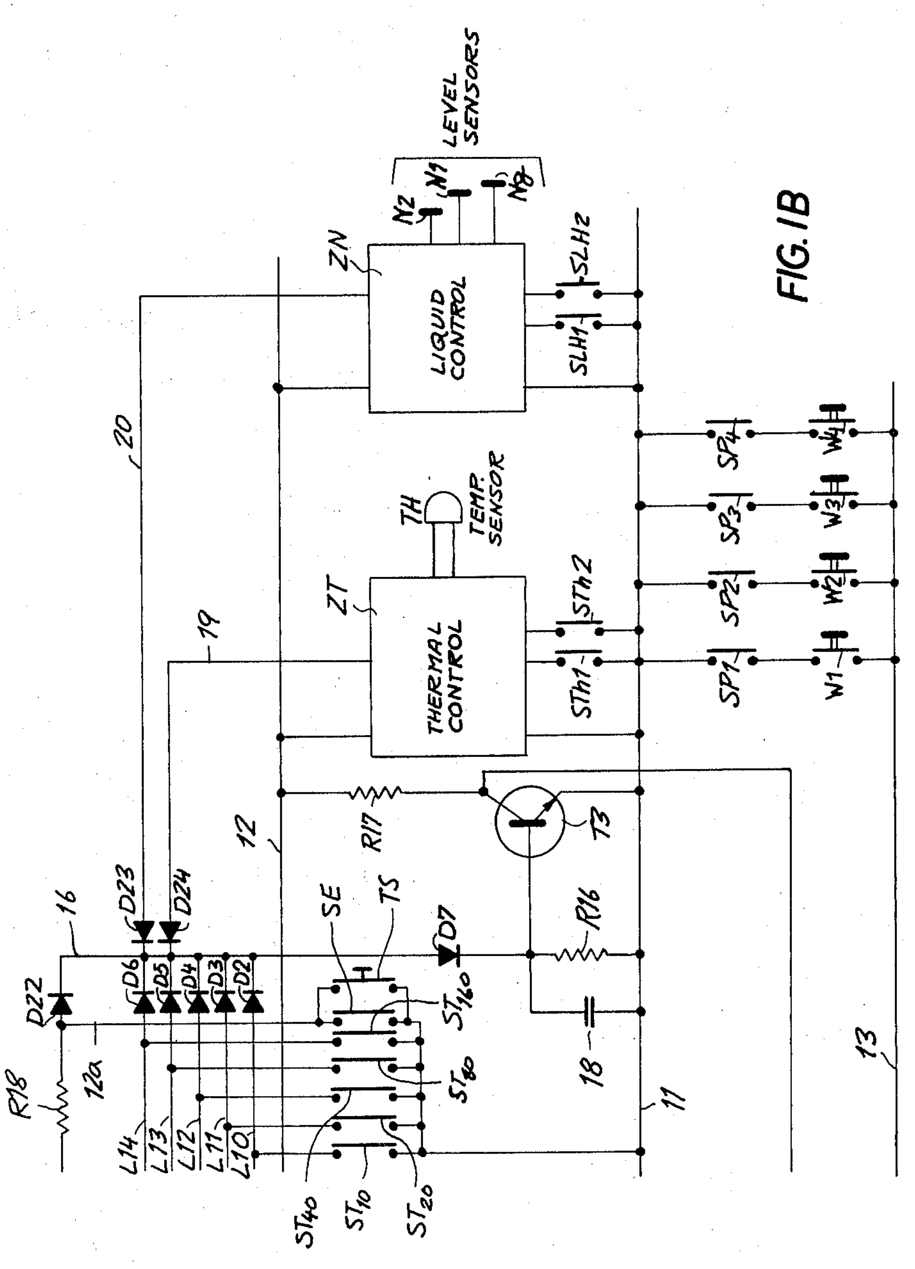
FIG. 1B is a similar circuit diagram complementing that of FIG. 1A to show the entire programmer.

As shown in FIGS. 1A and 1B, an electronic programmer for a nonillustrated household appliance (e.g. a washing machine) comprises an input transformer NTR whose primary winding $NTR_I$ is plugged into an outlet of a supply network delivering alternating current at 50 Hz. A secondary winding $NTR_{II}$ of this transformer feeds a squarer which includes a half-wave rectifier Gr1 in the connector lead of the transistor T1 whose collector and base are interconnected by a resistor R1. Another resistor R2, connected across terminals *a* and *c*, bridges the collector/emitter path of this transistor; a diode D1 in series with a resistor R3 shunts the secondary winding $NTR_{II}$, the junction of this diode and resistor being tied to the base of another transistor T2 whose emitter is grounded at *d* and whose collector is connected through a resistor R4 to the emitter terminal *c* of transistor T1. A capacitor C shorts alternating-current components of the incoming sine wave to ground at *b*, terminals *b* and *d* lying on a bus bar 11 which is joined to the base of transistor T1 by way of a Zener diode Z. The voltage drop developed across diode D1 on positive half-cycles overdrives the transistor T2 whereby a substantially rectangular pulse train of identical pulse width and pulse spacing, i.e., a square wave, appears at a terminal *e* representing the junction of resistor R4 with the collector of transistor T2. Terminal $c$ leads into a positive bus bar 12 carrying substantially constant voltage as determined by integrating network C, R1 and Zener Z.

Bus bars 11 and 12 supply operating current to several circuit components IC1 IC2, ZT, ZN more fully described hereinafter. Components IC1 and IC2 are two modular units each representing a seven-stage section of a binary frequency divider connected in cascade to terminal $e$. Each divider stage is a flip-flop with a single input and with an output which is energized in the set stage of the flip-flop as is well known per se. The stage inputs, numbered E1 – E7 in unit IC1 and E8 – E14 in unit IC2, and the stage outputs, numbered A1 – A7 in the first unit and A8 – A14 in the second unit, are interconnected in the usual way with the input of each stage except the first one tied to the output of the immediately preceding one. The outputs of the 14 stages are connected through respective diodes D8 – D21 to a common conductor 13 which can be grounded by a contact SEK under the control of a program carrier in the form of a rotatable platter 14; the platter is driven through a shaft 15 by a miniature motor SM of the synchronous type whose energizing circuit includes a further secondary winding $NTR_{III}$ of input transformer NTR. With contact SEK closed, all inputs E2 – E14 are grounded so that the corresponding stages are inactive. Upon the subsequent reopening of contact SEK, the first pulse setting the flip-flop E1 drives conductor 13 sharply positive and, through the capacitances of diodes D9 – D21, sets any of the flip-flops that may have been reset at the instant of closure of contact SEK.

Figure 2:
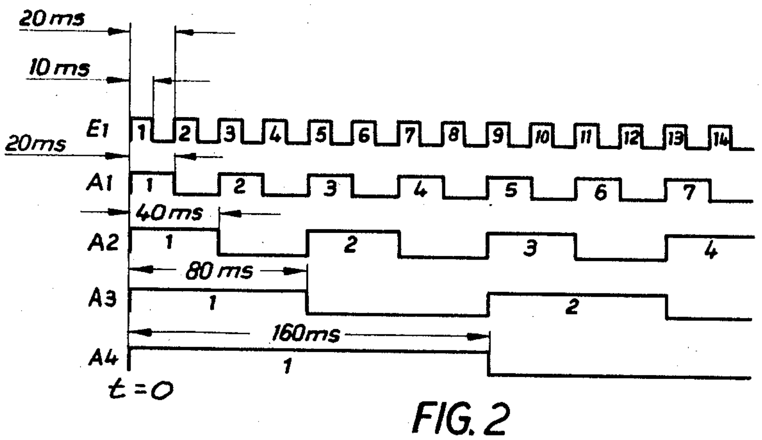
FIG. 2 is a set of graphs serving to explain the operation of the system of FIGS. 1A and 1B.

The pulse trains generated at input E1 of the first stage and at outputs A1 – A4 of the first four stages of unit IC1 have been plotted in FIG. 2, starting at a time $t = 0$ in which all the stages of the frequency divider have been reset. The basic square wave of cadence 50 Hz, delivered by terminal $e$ to divider input E1, has a period of 20 ms and a pulse width of 10 ms. The square wave on output A1 has a pulse width of 20 ms; the pulse widths of the square waves on the remaining stage outputs increase in the same geometric progression, i.e., to 40 ms on output A2, 80 ms on output A3 and 160 ms on output A4. Since $2^{10} \approx 10^3$, the foregoing numerical values in terms of milliseconds are substantially duplicated in terms of seconds at outputs A10 – A14. The pulse widths and cadences on all the stage terminals are thus as given in the following table:

| INPUT | OUTPUT | PULSE CADENCE (Hz) | PULSE WIDTH |
|---|---|---|---|
| E1 | — | 50 | 10 ms |
| E2 | A1 | 25 | 20 ms |
| E3 | A2 | 25/2 | 40 ms |
| E4 | A3 | 25/4 | 80 ms |
| E5 | A4 | 25/8 | 160 ms |
| E6 | A5 | 25/16 | 320 ms |
| E7 | A6 | 25/32 | 640 ms |
| E8 | A7 | 25/64 | 1280 ms |
| E9 | A8 | 25/128 | 2560 ms ≈ 25 sec. |
| E10 | A9 | 25/256 | 5120 ms ≈ 5 sec |
| E11 | A10 | 25/512 | 10240 ms ≈ 10 sec |
| E12 | A11 | 25/1024 | 20480 ms ≈ 20 sec |
| E13 | A12 | 25/2048 | 40960 ms ≈ 40 sec |
| E14 | A13 | 25/4096 | 81920 ms ≈ 80 sec |
| — | A14 | 25/8192 | 163840 ms ≈ 160 sec |

If the source frequency were 60 Hz instead of 50 Hz, all the foregoing values would have to be multiplied (column 3) or divided (column 4) by 1.2.

In the system here considered, only pulse widths of 10 seconds and up are of interest. The corresponding stage outputs A10 – A14 are connected to respective leads L10 – L14 including resistors R10 – R14; these leads are also connected to ground bus bar 11 by way of respective resistors R5, R6, R7, R8 and R9. Live bus bar 12 is connected through a branch 12$a$, including a resistor R18, and a diode D22 to a conductor 16 to which the leads L10 – L14 are also connected via respective diodes D2 – D6. Conductor 16 is returned to ground on bus bar 11 via a diode D7 and a resistor R16 in series therewith whose junction is tied to the base of a transistor T3 which represents a phase-inverting first stage of a two-stage electronic controller; the second controller stage is a thyristor Th connected by way of a full-wave rectifier bridge Gr2 in the energizing circuit of drive motor SM, the gate of this thyristor being joined by a lead 17 to the collector of transistor T3 and through a resistor R17 to positive bus bar 12. Base resistor R16 is shunted by a filter condenser 18. Diodes D2 – D6 and D22 lie all in tendem with diode D7.

Leads L10 – L14 are further connectable to ground bus bar 11 by way of individual selection contacts which have been respectively designated $ST_{10}$, $ST_{20}$, $ST_{40}$, $ST_{80}$ and $ST_{160}$, the subscripts of these contacts indicating the pulse widths (in ms) of the square waves appearing on these leads in conformity with the foregoing table. Two further contacts TS and SE are connected in parallel between bus-bar extension 12$a$ and ground on bus bar 11, contact TS being a manually operable start switch (such as a pushbutton) whereas contact SE is a homing switch held closed by the platter 14 in any off-normal position thereof. Contacts $ST_{10}$ – $ST_{160}$ are also controlled by the platter, in the same way as resetting contact SEK and as diagrammatically indicated for the latter in FIG. 1A.

Platter 14 may carry on its top side a set of cams coacting with stationary contacts to control the operation of pumps, heaters, valves and other devices intervening in the operation of the programmed appliance. The underside of the platter may carry conductive spring fingers which coact with printed circuitry forming bank contacts or stationary contact arcs to complete the connections diagrammatically represented by the carrier-controlled contacts SEK and $ST_{10}$ – $ST_{160}$. Other carrier-controlled contacts SP1 – SP4 of this type lie in series with respective pushbutton switches W1 – W4 and, upon manual closure of any of these switches, ground the conductor 13 to deactivate the frequency divided IC1, IC2 at a time when this divider would normally be restarted by the reopening of contact SEK upon the arrival of the platter 14 in one of its operating positions. Contacts SP1 – SP4 thus serve to override the selector ST10 – $ST_{160}$, on being temporarily closed in different phases of the program cycle, if the associated manual switches W1 – W4 have been closed at the beginning of the cycle.

Units ZT and ZN respectively monitor the temperature and the level of the wash liquid with the aid of associated sensors TH and N1, N2, Ng. These units are active only at certain times upon the grounding of respective terminals thereof by platter-controlled contacts STh1, STh2 or SLH1, SLH2. Closure of contact STh1 may let the unit ZT respond to a relatively low temperature level whereas closure of contact STh2 establishes a higher response temperature; in either case this unit then applies positive potential to an output lead 19 connected through a diode D24 to conductor 16 ahead of diode D7, lead 19 being deenergized as soon as the corresponding water temperature has been reached as determined by sensor TH. In an analogous manner, closure of contact SLH1 or SLH2 renders the unit ZN responsive to different liquid levels as measured by sensor N1 or N2, with energization of an output lead 20 until the corresponding level has been reached by the inflowing liquid; lead 20 also terminates at conductor 16, by way of a diode D23, ahead of diode D7. Level sensor Ng may be continuously effective to apply positive potential to lead 20 unless the water has reached a certain minimum level in the tank of the appliance.

The operation of the system shown in FIGS. 1A and 1B is as follows:

Normally, with platter 14 in its home position, contacts TS and SE are open so that positive voltage from terminal $c$ is transmitted via bus bar 12, resistor R18, diode D22 and diode D7 to the base of transistor T3 which saturates and substantially grounds its collector so that thyristor Th does not fire. Under these circumstances the energizing circuit of motor SM is open and platter 14 remains stationary. Contact SEK may be closed at the time so that frequency divider IC1, IC2 generates no output pulses.

Upon brief closure of start switch TS, transistor T3 is cut off by the grounding of its base so that its collector goes positive and causes the periodic firing of thyristor Th which therefore conducts during each half-cycle of the pulsating direct current passing the bridge Gr2. Motor SM now rotates at synchronous speed and advantages the platter 14 to its first position in which contact SEK opens so that the frequency divider IC1, IC2 is restarted at the point $t = 0$ of FIG. 2. If all five selection contacts $ST_{10} - ST_{160}$ are open in this position of the platter, conductors 16 will remain energized through the diode matrix D2 – D6 for the maximum interval amounting to 310 seconds as will be apparent from FIG. 2 and the foregoing table. If one or more of these selection contacts are closed by the platter in this operating position, the standstill interval will be correspondingly foreshortened. The five selection contacts can be set in 31 different combinations to provide intervals ranging from 10 seconds to 310 seconds by 10-second increments; in the trivial case of all contacts closed, all five of the leads L10 – L14 are grounded so that conductor 16 cannot be energized and motor SM is not stopped.

If, for example, contacts $ST_{10}$, $ST_{80}$ and $ST_{160}$ are closed, positive potential is first applied to conductor 16 via lead L12 for a period of 40 seconds; at the very instant when the pulse on lead L12 goes to zero, a pulse appears on lead L11 to maintain the energization of conductor 16 for another 20 seconds. Thus in this particular example, the motor SM is arrested for exactly 1 minute.

If switch W1 happens to be closed, closure of contact SP1 in a particular phase of the cycle shunts the contact SEK so that its opening in an operating position of the platter is ineffectual and the corresponding program step is skipped.

Figure 3:
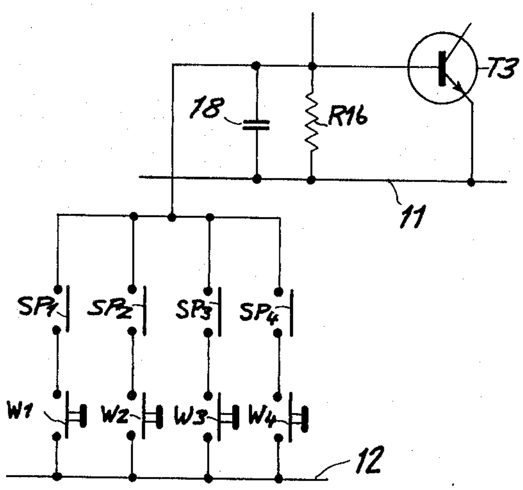
FIG. 3 is a fragmentary diagram showing a modification of part of the circuitry of FIG. 1A.

As illustrated in FIG. 3, the series combinations of manually settable switches W1 – W4 and platter-controlled circuit closers SP1 – SP4 could also be inserted, in parallel, between positive bus bar 12 and the base of transistor T3 in order to hold the latter saturated over the desired periods of platter rotation.

When the program is terminated, with platter 14 returning to its starting position, homing contact SE reopens and causes the permanent application of positive potential to the base of transistor T3 until start button TS is again pressed.

I claim:

1. An electronic programmer for automated equipment, comprising;

a program carrier provided with drive means for displacing same from a normal position through a succession of off-normal positions, including several operating positions, back to said normal position;

an actuating circuit for said drive means provided with electronic control means, said circuit including a homing contact closed by said program carrier in all off-normal positions thereof;

a multistage binary frequency divider connectable across a source of alternating current of a predetermined basic frequency for generating, at respective stage outputs, a plurality of square waves with pulse cadences harmonically related to one another and to said basic frequency;

contact means controlled by said program carrier in different operating positions thereof to connect selected stage outputs of said frequency divider to said control means for inhibiting the actuation of said drive means by way of said homing contact during standstill intervals determined by the pulse width of the square waves present on said selected stage outputs; and resetting means controlled by said program carrier to maintain said frequency divider in an inactive state during displacement of said program carrier between successive operating positions thereof.

2. A programmer as defined in claim 1 wherein said program carrier comprises a rotatable platter.

3. A programmer as defined in claim 1 wherein said contact means includes combinations of contacts for concurrently selecting, in certain of said operating positions, groups of stage outputs determining the duration of the corresponding standstill intervals by the combined pulse width of their square waves.

4. A programmer as defined in claim 1, further comprising manually operable switch means and coacting circuit-closing means controlled by said program carrier for maintaining said frequency divider inactive during at least one phase of a program cycle whereby said drive means remains actuated in at least one operating position of said program carrier regardless of the setting of said contact means in such operating position.

5. A programmer as defined in claim 1, further comprising monitoring means responsive to certain conditions of said automated equipment for transmitting to said control means, in at least one operating position of said program carrier, a supplemental signal extending the corresponding standstill interval beyond the duration established by said contact means.

6. A programmer as defined in claim 1 wherein said control means comprises an electronic switch provided with an input circuit, said stage outputs being connected in parallel to said input circuit through a diode matrix, said contact means being settable by said program carrier to establish shunt paths across said input circuit and individual diodes of said matrix.

7. A programmer as defined in claim 6, comprising a source of actuation-inhibiting potential connected to said input circuit through a further diode in parallel with the diodes of said matrix, said homing contact being controlled by said program carrier in any off-normal position thereof to establish a shunt path across said input circuit and said further diode.

8. A programmer as defined in claim 7, further comprising a manually operable start switch in parallel with said homing contact.

9. A programmer as defined in claim 6 wherein said electronic switch comprises a first stage including a transistor and a second stage including a thyristor, said transistor being saturable in the presence of a pulse from any of said stage outputs traversing said diode matrix, said thyristor being connected to fire in the cut-off state of said transistor.

10. A programmer as defined in claim 9 wherein said resetting means comprises a set of diodes connecting all said stage outputs to a common conductor and a contact closed during displacement of said program carrier for grounding said conductor.

* * * * *